Dec. 27, 1949                   C. G. BARDEN               2,492,914
COMBINATION REAR BUMPER, HITCH, AND
FOOT PLATFORM FOR VEHICLES
Filed Jan. 11, 1949                                             2 Sheets-Sheet 1
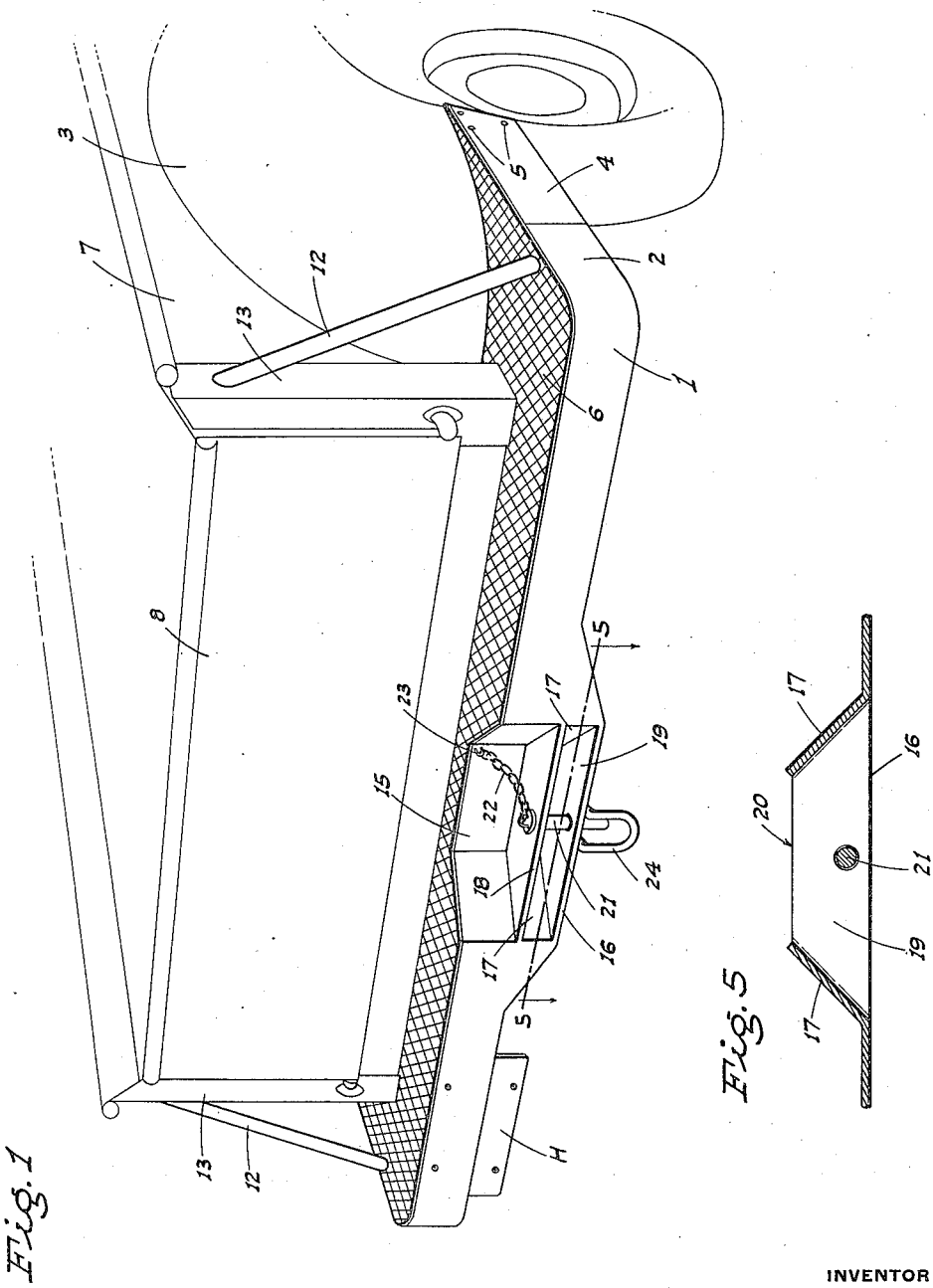
INVENTOR
Carl G. Barden
BY
ATTORNEYS Dec. 27, 1949     C. G. BARDEN     2,492,914
COMBINATION REAR BUMPER, HITCH, AND
FOOT PLATFORM FOR VEHICLES
Filed Jan. 11, 1949     2 Sheets-Sheet 2
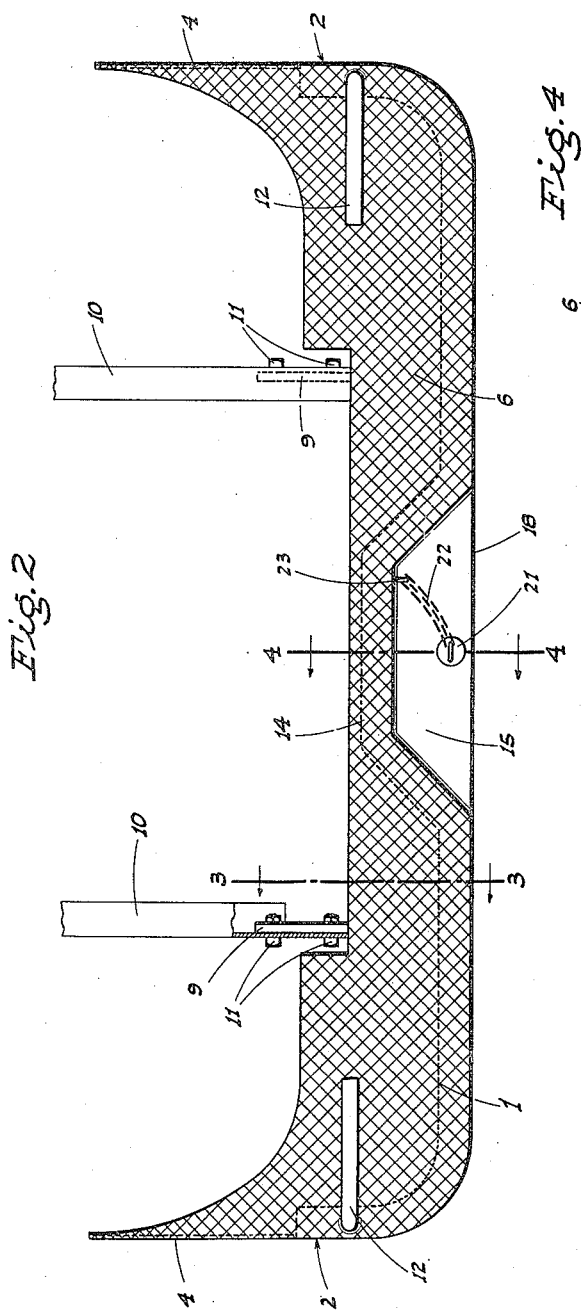
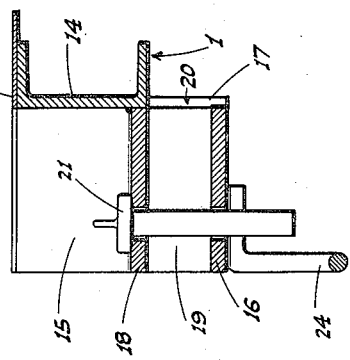
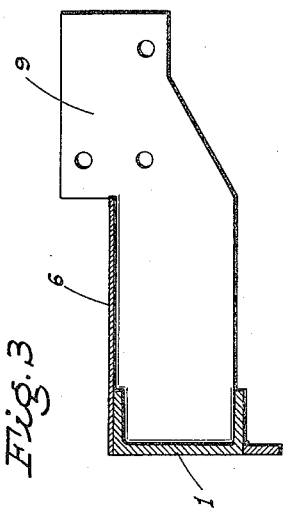
INVENTOR
Carl G. Barden
BY
ATTORNEYS Patented Dec. 27, 1949

2,492,914

UNITED STATES PATENT OFFICE 2,492,914

COMBINATION REAR BUMPER, HITCH, AND FOOT PLATFORM FOR VEHICLES

Carl G. Barden, Woodland, Calif.

Application January 11, 1949, Serial No. 70,228

10 Claims. (Cl. 280—33.44)

The present invention is directed to, and it is an object to provide, a combination rear bumper, trailer hitch, and foot platform for the rear of trucks, especially trucks of the "pick-up" body type.

Another object of the invention is to provide a combination structure, as above, which is designed primarily for attachment to a truck as an accessory.

A further object of the invention is to provide a combination structure, as described, which adds greatly to the convenience of use of a truck, and also provides greater safety from rear end collision than with a conventional bumper.

An additional object is to provide a combination bumper, hitch, and foot platform structure wherein the hitch unit is mainly recessed for protection, and to assure of rigidity in the assembly of parts.

It is also an object of the invention to provide a combination bumper, hitch, and foot platform structure which is designed for ease and economy of manufacture, and ready attachment to a conventional truck.

A further object of the invention is to provide a practical and reliable combination rear bumper, hitch, and foot platform for vehicles, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the combination structure as mounted in connection with a truck of pick-up body type.

Fig. 2 is a plan view of the structure, shown detached except for the illustration of the manner of mounting the structure to the longitudinal frame beams of the truck.

Fig. 3 is a cross section on line 3—3 of Fig. 2.

Fig. 4 is a cross section on line 4—4 of Fig. 2.

Fig. 5 is a fragmentary sectional plan view on line 5—5 of Fig. 1.

Referring now more particularly to the characters of reference on the drawings, the combination rear bumper, hitch, and foot platform for vehicles, such as pick-up body type trucks, comprises a heavy-duty transverse bumper bar 1 of inwardly opening channel configuration, which bumper bar is disposed to the rear of the vehicle, as shown.

The bumper bar 1 extends substantially full width of the vehicle, and such bar is formed, at its ends, with forward extensions 2 which project toward, but terminate clear of, the fenders 3 of the truck. The extensions 2 are formed with forwardly projecting side skirts 4 which are of a length so that they engage, at their forward ends, with the corresponding fender 3 on the outside, being secured to the latter at such point by rivets or bolts 5.

The above may be termed the bumper unit of the structure, such unit being covered from end to end with a foot platform 6 made of deck plate; such foot platform, at its outer edge, being symmetrical to the bumper unit and secured thereto, as by welding. At its inner or forward edge the foot platform 6 is cut symmetrical to, and lies substantially in engagement with, the fenders 3 and the rear lower portion of the body 7 of the truck. In the present illustration the body 7 is of pick-up type and includes a rear endgate 8 above the foot platform 6.

The main support for the transverse bumper bar 1 comprises a pair of vertical, forwardly projecting attachment plates 9 which extend from the bumper bar 1 beneath the foot platform 6 on opposite sides of the longitudinal center line of the vehicle; such attachment plates being positioned to lie closely alongside the rear ends of the longitudinal frame beams 10 of the truck; the attachment plates 9 being secured to said frame beams 10 by cross bolts 11.

Additional support for the structure is obtained by means of brace rods 12 which extend at an upward and inward incline from the forward extensions 2 of the bumper bar to connection, as by welding, with the rear corner posts 13 of the body 7 of the chuck.

A license plate holder H is affixed to, and depends from, the bumper bar adjacent one end thereof.

Centrally of its ends the structure is formed with a trailer hitch constructed as follows:

The bumper bar 1 is formed with a central forward offset 14 to provide, intermediate the ends of said bumper bar 1, a central recess 15. The recess 15 is open at the top, and closed at the bottom by a horizontal plate 16; the recess 15 being of somewhat greater depth than the bumper bar 2. This increase in depth is accomplished through the addition of skirt plates 17 on opposite sides of said recess.

Another horizontal plate 18 is fixed in the central recess 15 above the bottom plate 16, but a substantial distance below the upper end of said recess; the plates 16 and 18 forming a tongue receiving pocket 19 therebetween. It should be noted that the sides of the pocket 19 flare laterally outward in a rearward direction whereby to permit of freedom of swinging movement of the trailer tongue which is adapted to be engaged in the pocket 19. Additionally, the latter is open at the front end, as at 20, to permit the trailer tongue to project therethrough if necessary.

The trailer tongue is pivotally held in the pocket 19 by means of a removable hitch pin 21, which engages—from above—through matching bores in the plates 16 and 18, such hitch pin being held against loss by a normally slack chain 22 disposed in the upper portion of the recess 15 and anchored therein, as at 23.

An eye 24 is fixed to the bottom plate 16 and depends therefrom directly to the rear of the hitch pin 21; such eye 24 being adapted for connection with the safety chain (not shown) of the trailer.

The construction of the above described trailer hitch is such that a trailer tongue can be quickly and readily attached or detached, and the hitch when in use is strong and reliable.

It should also be noted that no parts of the trailer hitch project rearwardly of the bumper bar 1, so that the hitch is not subject to being easily damaged.

With a combination structure as described above, there is provided, in addition to the foregoing hitch, a very strong and effective bumper, which prevents damage — from rear end collision — not only to the rear end of the body 7, but also the rear portions of the fenders 3.

Further, the foot platform 6 which is included in the structure provides for convenient access to the pick-up body 7; a person being able to stand, with stable footing, at any point along the length of said foot platform.

A further advantage of the foot platform 6 is that it acts effectively as a rock guard.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A combination bumper and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, and a foot platform covering the structure from end to end thereof; the forward edge of the foot platform being symmetrical to and closely adjacent the fenders and rearwardly exposed portions of the body.

2. A combination bumper and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, and a foot platform covering the structure from end to end thereof; there being brace rods extending upward from the end portions of the structure to connection with opposite sides of the body adjacent the rear thereof and above said foot platform.

3. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, and a foot platform covering the structure from end to end thereof; there being a trailer hitch formed in connection with the bumper bar centrally of its ends and below the foot platform.

4. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, a foot platform covering the structure from end to end thereof, and a trailer hitch formed in connection with the bumper bar centrally of its ends and below the foot platform; said trailer hitch comprising a forward, central offset in the bumper bar forming a rearwardly opening recess, vertically spaced horizontal plates secured in the recess, and a vertical hitch pin removably engaging through said plate from above.

5. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, a foot platform covering the structure from end to end thereof, and a trailer hitch formed in connection with the bumper bar centrally of its ends and below the foot platform; said trailer hitch comprising a forward, central offset in the bumper bar forming a rearwardly opening recess, vertically spaced horizontal plates secured in the recess, and a vertical hitch pin removably engaging through said plate from above, the upper plate in the recess being below the top of the latter, and a normally slack retention chain in the recess, above said upper plate, extending between the pin and an anchor point.

6. A structure, as in claim 5, in which the recess is formed with an open top.

7. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, a foot platform covering the structure from end to end thereof, and a trailer hitch formed in connection with the bumper bar centrally of its ends and below the foot platform; said trailer hitch comprising a forward, central offset in the bumper bar forming a rearwardly opening recess, vertically spaced horizontal plates secured in the recess, and a vertical hitch pin removably engaging through said plate from above; the sides of the recess diverging laterally outward in a rearward direction.

8. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, a foot platform covering the structure from end to end thereof, and a trailer hitch formed in connection with the bumper bar centrally of its ends and below the foot platform; said trailer hitch comprising a forward, central offset in the bumper bar forming a rearwardly opening recess, vertically spaced horizontal plates secured in the recess, and a vertical hitch pin removably engaging through said plate from above; the pocket formed between said plates being open at front.

9. A combination bumper, hitch, and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, a foot platform covering the structure from end to end thereof, and a trailer hitch formed in connection with the bumper bar centrally of its ends and below the foot platform; said trailer hitch comprising a forward, central offset in the bumper bar forming a rearwardly opening recess, vertically spaced horizontal plates secured in the recess, and a vertical hitch pin removably engaging through said plate from above; the sides of the recess diverging laterally outward in a rearward direction.

10. A combination bumper and foot platform structure for a truck which includes rear fenders and a frame-supported body exposed between said fenders, the structure comprising a transverse bumper bar disposed to the rear of the fenders and body, transversely spaced attachment members projecting forward from the bumper bar intermediate its ends and secured to the truck frame, end extensions projecting forward from the bumper bar and secured to the fenders, and a foot platform covering the structure from end to end thereof; the bumper bar being of inwardly opening channel shape, in cross section, for a major portion of its length.

CARL G. BARDEN.

REFERENCES CITED

The following references are of record in the file of this patent:

UNITED STATES PATENTS

| Number | Name | Date |
|---|---|---|
| 1,337,275 | Sandt et al. | Apr. 20, 1920 |
| 2,452,785 | Olney | Nov. 2, 1948 |
| 2,476,814 | Carmack et al. | July 19, 1949 |